US00RE48106E

(19) United States
(12) Reissued Patent
Stein

(10) Patent Number: US RE48,106 E
(45) Date of Reissued Patent: Jul. 21, 2020

(54) DETECTION OF OBSTACLES AT NIGHT BY ANALYSIS OF SHADOWS

(71) Applicant: MOBILEYE VISION TECHNOLOGIES LTD., Jerusalem (IL)

(72) Inventor: Gideon Stein, Jerusalem (IL)

(73) Assignee: MOBILEYE VISION TECHNOLOGIES LTD., Jerusalem (IL)

(21) Appl. No.: 15/940,173

(22) Filed: Mar. 29, 2018

Related U.S. Patent Documents

Reissue of:
(64) Patent No.: 9,297,641
Issued: Mar. 29, 2016
Appl. No.: 13/710,564
Filed: Dec. 11, 2012

U.S. Applications:
(60) Provisional application No. 61/569,306, filed on Dec. 12, 2011, provisional application No. 61/702,755, filed on Sep. 19, 2012.

(51) Int. Cl.
*G01B 11/02* (2006.01)
*H04N 7/18* (2006.01)
*G06K 9/00* (2006.01)

(52) U.S. Cl.
CPC ..... *G01B 11/02* (2013.01); *G06K 9/00805* (2013.01)

(58) Field of Classification Search
CPC ..... G06T 2207/30264; G06T 2207/30236
USPC ..... 382/187, 204
See application file for complete search history.

(56) References Cited

U.S. PATENT DOCUMENTS 5,410,346 A * 4/1995 Saneyoshi ..... B60R 1/00 348/116
5,793,900 A * 8/1998 Nourbakhsh ..... G06T 7/571 382/263
5,995,677 A * 11/1999 Jones ..... H04N 5/2628 348/E5.055

(Continued)

FOREIGN PATENT DOCUMENTS

EP 1708125 A1 10/2006

OTHER PUBLICATIONS

European Patent Office, communication pursuant to Article 94(3) EPC, dated May 8, 2015, App. No. EP12275201.7.

(Continued)

*Primary Examiner* — Nick Corsaro
(74) *Attorney, Agent, or Firm* — Finnegan, Henderson, Farabow, Garrett & Dunner LLP

(57) ABSTRACT

A driver assistance systems mountable in a host vehicle while the host vehicle is moving forward with headlights on for detection of obstacles based on shadows. The driver assistance system includes a camera operatively connectible to a processor. A first image frame and a second image frame are captured of a road. A first dark image patch and a second dark image patch include intensity values less than a threshold value. The first and the second dark image patches are tracked from the first image frame to the second image frame as corresponding images of the same portion of the road. Respective thicknesses in vertical image coordinates are measured of the first and second dark image patches responsive to the tracking.

25 Claims, 13 Drawing Sheets

(56) References Cited

U.S. PATENT DOCUMENTS

| | | | | |
|---|---|---|---|---|
| 6,172,601 | B1 * | 1/2001 | Wada | B60R 1/00 340/436 |
| 6,829,388 | B1 * | 12/2004 | Sakurai | G06T 7/12 340/435 |
| 7,411,486 | B2 | 8/2008 | Gern et al. | |
| 2006/0111841 | A1 * | 5/2006 | Tseng | B60R 1/00 701/301 |
| 2006/0222208 | A1 | 10/2006 | Leleve et al. | |
| 2008/0159595 | A1 * | 7/2008 | Park | G01S 17/48 382/106 |
| 2009/0268948 | A1 * | 10/2009 | Zhang | G06K 9/00798 382/104 |
| 2010/0060487 | A1 * | 3/2010 | Augst | G06K 9/2036 340/937 |
| 2010/0097458 | A1 * | 4/2010 | Zhang et al. | 348/119 |
| 2011/0063097 | A1 | 3/2011 | Naka et al. | |
| 2011/0115615 | A1 * | 5/2011 | Luo et al. | 340/436 |
| 2011/0262009 | A1 | 10/2011 | Duan et al. | |
| 2012/0140061 | A1 * | 6/2012 | Zeng | 348/135 |
| 2012/0170808 | A1 * | 7/2012 | Ogata | G06K 9/00798 382/103 |

OTHER PUBLICATIONS

European Patent Office, extended European search report pursuant to Rule 62 EPC, dated Jun. 6, 2014, Appl. No. EP 12275201.7.

Belluta, P., et al., "Terrain Perception for DEMO III," Proceedings of the IEEE Intelligent Vehicles Symposium 2000, Dearborn, (MI), USA Oct. 3-5, 2000.

Larson, Jacoby, "Lidar Based Off-Road Negative Obstacle Detection and Analysis," 2011 14$^{th}$ International IEEE Conference on Intelligent Transportation Systems Washington, D.C., USA, Oct. 5-7, 2011.

Proceedings of the IEEE Intelligent Vehicles Symposium 2000 Dearborn (MI), USA Oct. 3-5, 2000 "Terrain Perception for Demo III", P. Bellutta, et al.

2011 14th International IEEE Conference on Intelligent Transportation Systems Washington, DC, USA. Oct. 5-7, 2011, "Lidar Based Off-road Negative Obstacle Detection and Analysis", Jacoby Larson.

2011 IEEE/RSJ International Conference on Intelligent Robots and Systems Sep. 25-30, 2011. San Francisco, CA, USA, "Positive and Negative Obstacle Detection using the HLD Classifier", Ryan D. Morton et al.

2008 IEEE/RSJ International Conference on Intelligent Robots and Systems Acropolis Convention Center Nice, France, Sep. 22-26, 2008, "Detecting Obstacles and Drop-offs using Stereo and Motion Cues for Safe Local Motion", Aniket Murarka.

"Nighttime negative obstacle detection for off-road autonomous navigation", Alturo L. Rankin et al., SPIE, 2007.

"Preliminary investigation into the use of stereo illumination to enhance mobile robot terrain perception", Gary Witus, Unmanned Ground Vehicle Technology III, Grant R. Gerhart, Chuck M. Shoemaker, Editors, Proceedings of SPIE vol. 4364 (2001) © 2001 SPIE, pp. 290-301.

Bellutta, Paul, et al. "Terrain perception for DEMO III." Intelligent Vehicles Symposium, 2000. IV 2000. Proceedings of the IEEE. IEEE, 2000.

Hu, Tingbo, et al. "Negative obstacle detection from image sequences." 3rd International Conference on Digital Image Processing. International Society for Optics and Photonics, 2011.

European Patent Office, extended European search report persuant to Rule 62 EPC, Jun. 6, 2014, App No. EP12275201.7.

* cited by examiner

70

DETECTION OF OBSTACLES AT NIGHT BY ANALYSIS OF SHADOWS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application claims priority from US provisional application 61/569,306 filed Dec. 12, 2011 and from U.S. provisional application 61/702,755 filed Sep. 19, 2012 which are included herein by reference.

BACKGROUND

1. Technical Field

The present invention relates to the field of driver assistance systems (DAS) and in particular to detection of obstacles in a road using a camera.

2. Description of Related Art

Larson et al. [1] perform detection of negative obstacles using LIDAR and other three dimensional data. Belutta et al. [2] detect depth discontinuities of negative obstacles from stereo range data. Rabkin et al. [3] use stereo range data on thermal cameras because the shape of the terrain also affects the thermal properties. Muraka et al. [4] combine stereo and motion information to detect discontinuities in daytime. They assume a piecewise planar model and show results from indoor and outdoor environment. The range of detection of drop-offs is limited to a few meters since texture is required for stereo and motion correspondence. Witus et al. [5] analyze the shadows produced by light sources mounted on the host vehicle using a stereo camera. Detection range is limited by camera focal length and stereo baseline. Furthermore, depth information on the shadow edge is only available when the light sources are displaced along the stereo baseline. In contrast, a typical stereo camera for driver assistance applications has the two cameras mounted side by side and the headlights are below the cameras.

References

1. Larson et al., "Lidar based off-road negative obstacle detection and analysis" In 14th International IEEE Conference on Intelligent Transportation Systems (ITSC), October 2011
2. Belutta et al., "Terrain Perception for Demo III", In Proceedings of the IEEE Intelligent Vehicles Symposium (IV) 2000, October 2000
3. Rabkin et al. "Nighttime negative obstacle detection for off-road autonomous navigation In Unmanned Systems", Technology IX. Edited by Gerhart, Grant R.; Gage, Douglas W.; Shoemaker, Charles M. Proceedings of the SPIE, Volume 6561, pp. 656103 (2007)
4. Muraka "Detecting obstacles and drop-offs using stereo and motion cues for safe local motion", In IEEE/RSJ International Conference on Intelligent Robots and Systems, IROS 2008 September 2008
5. Witus et al. Preliminary investigation into the use of stereo illumination to enhance mobile robot terrain perception In Proc. SPIE Vol. 4364, p. 290-301, Unmanned Ground Vehicle Technology III, Grant R. Gerhart; Chuck M. Shoemaker; Eds.]

BRIEF SUMMARY

Various driver assistance systems and corresponding methods are provided for herein performable at night for detection of obstacles based on shadows. The driver assistance systems are mountable in a host vehicle while the host vehicle is moving forward with headlights on. The driver assistance systems include a camera operatively connectible to a processor. A first image frame and a second image frame are captured of a road in the field of view of the camera. The first and the second image frames are processed to locate a first dark image patch of the first image frame and a second dark image patch of the second image frame; The first image frame and the second image frame may be filtered with a threshold value of gray scale to produce the first dark image patch of the first image frame and the second dark image patch of the second image frame. The first dark image patch and the second dark image patch include intensity values less than the threshold value. Alternatively, the processing to find the first and second dark image patches may include searching for a transition from light to dark (e.g. high gray scale to low gray scale values) and another transition from dark to light. The first and the second dark image patches are tracked from the first image frame to the second image frame as corresponding images of the same portion of the road. Respective thicknesses in vertical image coordinates are measured of the first and second dark image patches responsive to the tracking performed from the first image frame to the second image frame.

Prior to the tracking, connectivity of picture elements may be performed within the first and second dark image patches. It may be determined that a change of the thicknesses between the first and second dark image patches is consistent with a shadow cast by an obstacle in the road from illumination from the headlights and an obstacle in the road is detected. A driver of the host vehicle may be audibly warned responsive to the detection of the obstacle.

The change in the thicknesses between the first and second image frames may be analyzed to distinguish between the detected obstacle being a positive or a negative obstacle and/or a shape of the detected obstacle may be computed.

It may be determined that a change of the thicknesses between the first and second image frames is not consistent with a shadow cast by an obstacle from illumination from the headlights. The thicknesses may be measured in picture elements according to a total number of picture elements with intensity values less than the threshold divided by a width in picture element columns of the first and second dark image patches.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein:

FIG. 6b shows a gray-scale profile for a simple step in brightness with no dark shadow patch for the change in asphalt color shown in FIG. 6a.

DETAILED DESCRIPTION

Figure 1:
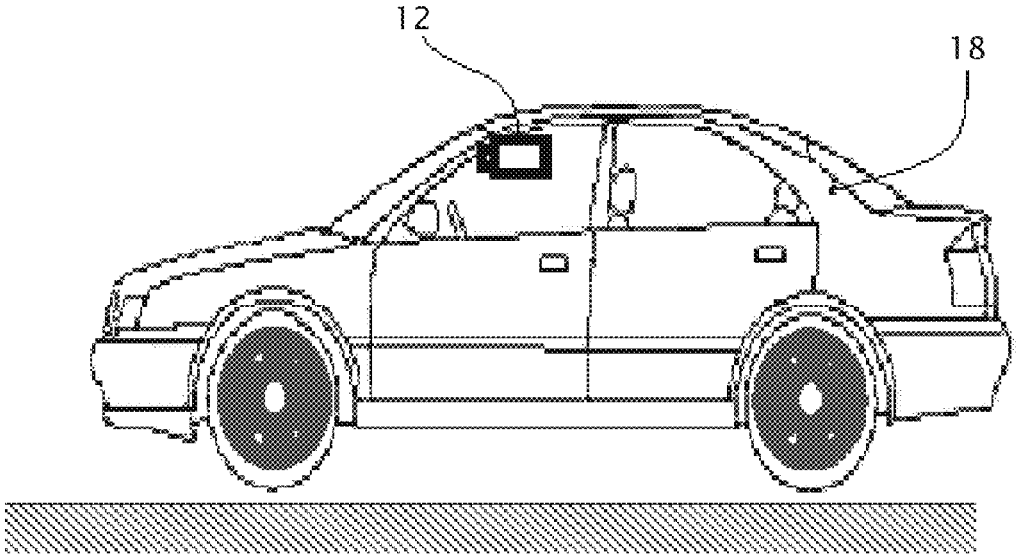
FIGS. 1 and 2 illustrate a system including a camera or image sensor mounted in a host vehicle, according to an aspect of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, aspects of the present invention are directed to driver assistance systems using forward facing cameras which are becoming mainstream. These forward facing cameras may be rigidly mounted inside the driver cabin near the rear-view mirror. Cameras mounted inside the driver cabin near the rear-view mirror puts the cameras at a fixed position, significantly above the vehicle headlights. With the fixed position, the shadows produced by the headlights, when driving on dark roads, are visible in the camera image. The following detailed description describes how to use these shadows to enhance obstacle detection. In particular the description describes how the shadows can be used for detecting speed-bumps and negative obstacles at night from a moving vehicle. The information from the enhanced obstacle detection can be used to warn the driver or to prepare the vehicle for the anticipated change in road surface. The detailed description also gives a detailed analysis of the particular image motion characteristics of the shadow when the host vehicle is moving forward. The information from the detailed analysis allows the discrimination between shadows and other dark patches on the road and then, through careful analysis of the shadow over time, both the depth and shape of the obstacle can be determined. The detection range from shadow analysis may be significantly larger than what is possible from stereo or structure from motion (SFM) in dark night conditions.

As host vehicle moves forward, the image of a dark patch of a shadow, produced by the host vehicle headlights, behaves very differently to other dark patches on the road such as those due to tar patches, differences in asphalt color or shadows due to other light sources.

It will be shown below that the image of a mark on a road surface will increase as a function of the inverse of the distance (Z) squared, where Z is the distance from the camera to the mark on the road surface:

$$\frac{1}{Z^2} = Z^{-2}$$

While the size of a shadow produced by a sharp negative edge will increase only as a function of the inverse of the distance (Z):

$$\frac{1}{Z} = Z^{-1}$$

The shadow of a round edge, such as the far side of a speed bump, will increase even more slowly. By tracking the dark patch over time it is possible to differentiate between shadows and road marks.

The difference in the observed behavior can be explained as follows. A mark on the road retains its size (in world coordinates) as a host vehicle approaches. With a sharp negative obstacle, the visible part of the shadow extends from the top of the negative obstacle step to the far side of the shadow. When the host vehicle moves towards the obstacle, the lighting angle changes and the far edge of the shadow on the road moves and the extent of the shadow on the road is decreased significantly. If the edge producing the shadow is rounded the closer edge of the shadow is formed by the tangent point of the edge. As the host vehicle moves forward the tangent point moves further away and drops in height. These two factors of the edge and the host vehicle moving forward, reduce the size of the shadow on the road even further.

Figure 2:
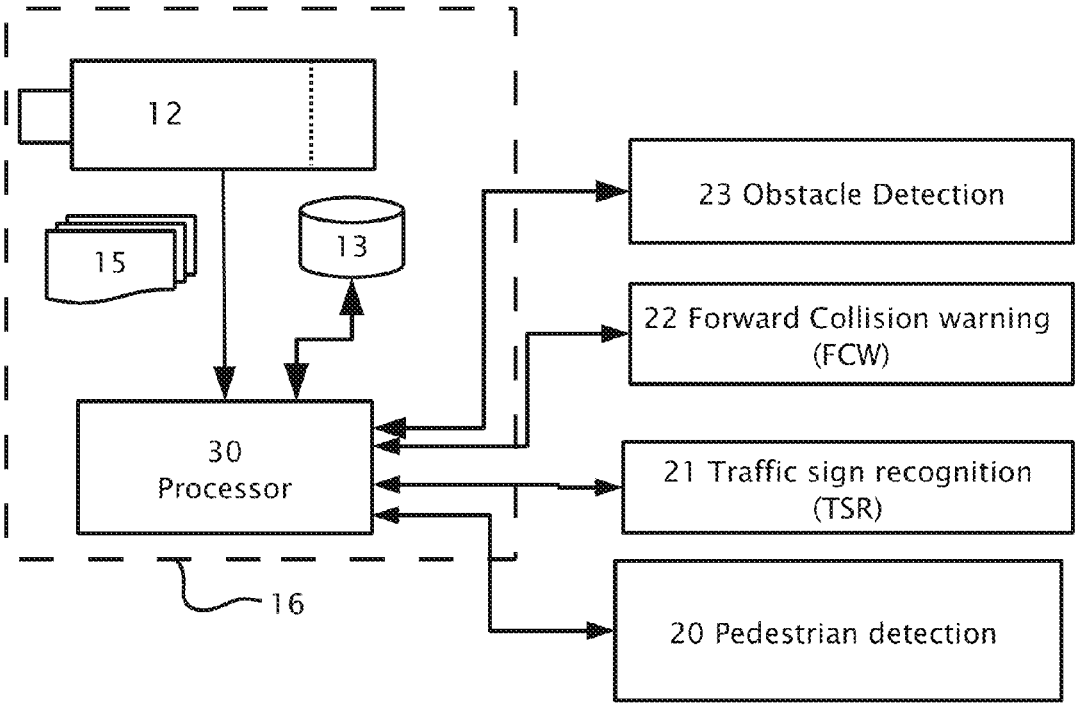

Referring now to the drawings, reference is now made to FIGS. 1 and 2 which illustrate a system 16 including a camera or image sensor 12 mounted in a host vehicle 18, according to an aspect of the present invention. Image sensor 12, imaging a field of view in the forward direction provides image frames 15 in real time and image frames 15 are captured by an image processor 30. Processor 30 may be used to process image frames 15 simultaneously and/or in parallel to serve a number of advanced driver assistance systems/applications. The advanced driver assistance systems (ADAS) may be implemented using specific hardware circuitry with on board software and/or software control algorithms in memory 302. Image sensor 12 may be monochrome or black-white, i.e. without color separation or image sensor 12 may be color sensitive. By way of example in FIG. 2, image frames 15 are used to serve pedestrian detection 20, traffic sign recognition (TSR) 21 forward collision warning (FCW) 22 and obstacle detection 23 using shadows, according to embodiments of the present invention. Processor 30 may be used to process image frames 15 to detect and recognize an image or portions of the image in the forward field of view of camera 12.

In some cases, image frames 15 are partitioned between different driver assistance applications and in other cases the image frames 15 may be shared between the different driver assistance applications.

Although embodiments of the present invention are presented in the context of driver assistance applications, embodiments of the present invention may be equally applicable in other real time signal processing applications and/or digital processing applications, such as communications, machine vision, audio and/or speech processing as examples.

Figure 3A:
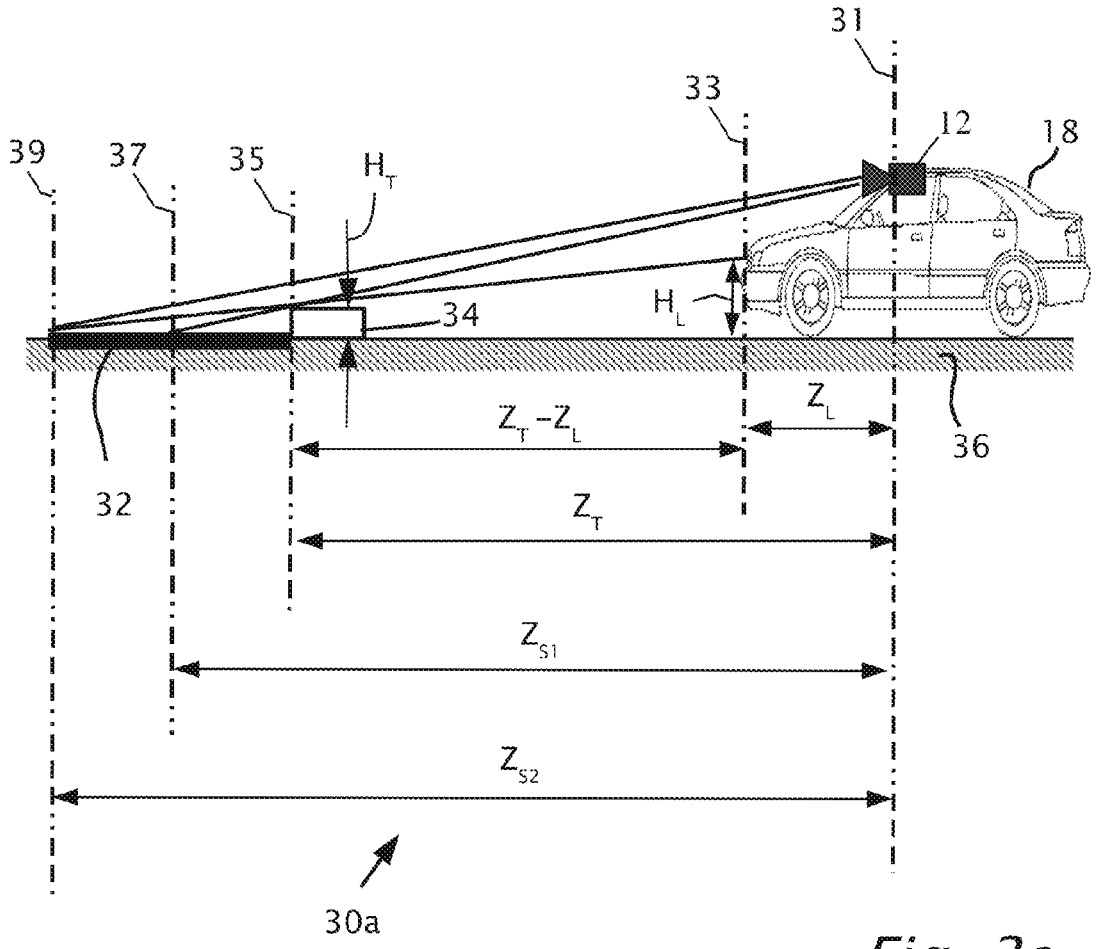
FIGS. 3a and 3b show a simplified line drawings of a night time driving scenario, according to a feature of the present invention.

Reference is now made to FIG. 3a which shows a simplified line drawing 30a of a night time driving scenario, according to a feature of the present invention. Camera 12 is mounted in close proximity to the host vehicle 18 windshield and host vehicle 18 headlights illuminate the scene ahead as host vehicle 18 travels along road surface 36. Host vehicle 18 headlights produce a shadow 32 on the road when there is a obstacle. In the example shown in FIG. 3a the obstacle is low object 34 on road 36. Low object 34 may be for example a speed bump, raised manhole cover but the discussion that follows is the same for a negative obstacle such as a drop or pothole. Since the camera 12 is mounted higher than the headlights, shadow 32 can be seen by camera 12 in host vehicle 18. Negative obstacles and speed bumps produce dark patches in image frames 15.

In FIG. 3a are a number of distances, where distance is designated as Z in the equations which are shown later on the detailed descriptions that follow. Let the coordinate system reference point (0,0) be the point on the road 36 directly below camera 12, indicated by dotted line 31. $H_C$ is the height of camera 12, $H_L$ the height of the headlight of host vehicle 18 and $H_T$ the height of obstacle 34. The headlights of vehicle 18 are $Z_L$ in front of camera 12, that is the distance between dotted lines 31 and 33. $Z_T$ is the distance from camera 12 to the edge of obstacle 34, that is the distance between dotted lines 31 and 35. $Z_{S1}$ and $Z_{S2}$ are the close and far points on shadow 32 which are visible to camera 12, the distances between dotted lines 31 and 37 and dotted lines 31 and 39 respectively.

Figure 3B:
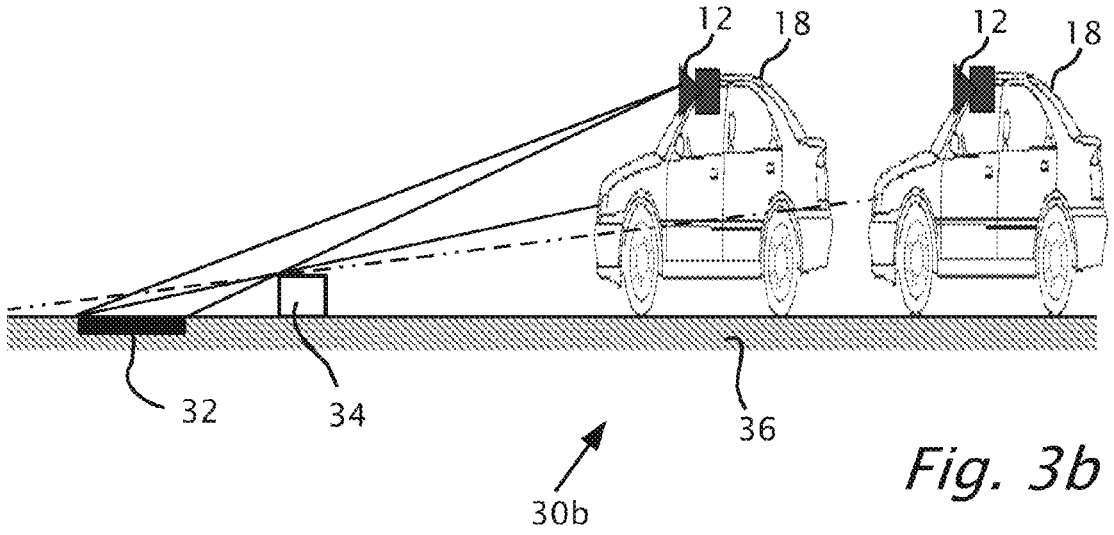

Reference is now made to FIG. 3b which shows a simplified line drawing 30b of a night time driving scenario, according to a feature of the present invention. Two host vehicles 18 are shown with respective cameras 12. From FIG. 3b it can be seen that when host vehicle 18 moves forward towards obstacle 34, the extent of shadow 32 becomes smaller.

When host vehicle 18 moves towards the obstacle 34, the lighting angle changes and the far edge of shadow 32 on road 36 moves and the extent of shadow 32 on road 36 is decreased significantly. If the edge producing shadow 32 is rounded, the closer edge of shadow 32 is formed by the tangent point of the edge. As host vehicle 18 moves forward the tangent point moves further away and drops in height. These two factors of the edge and the host vehicle 18 moving forward, reduce the size of shadow 32 on road 36 even further.

Figure 4A:
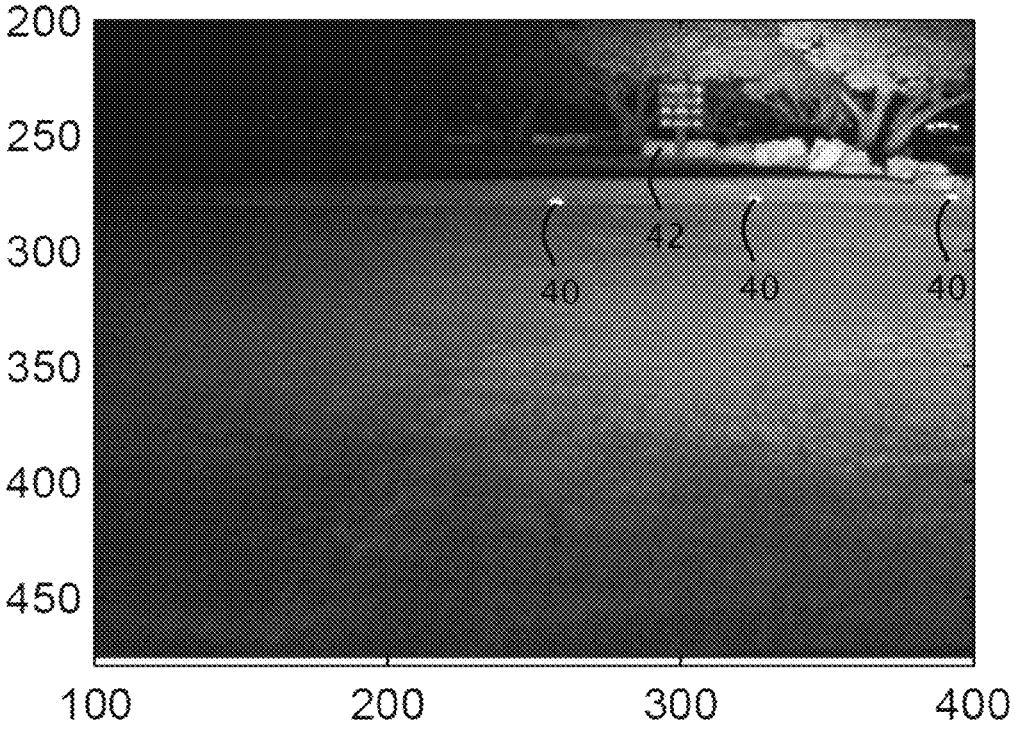
FIGS. 4a and 4b show image frames of a speed bump where a host vehicle is at different distances from the speed bump to illustrate feature of the present invention.
Figure 4B:
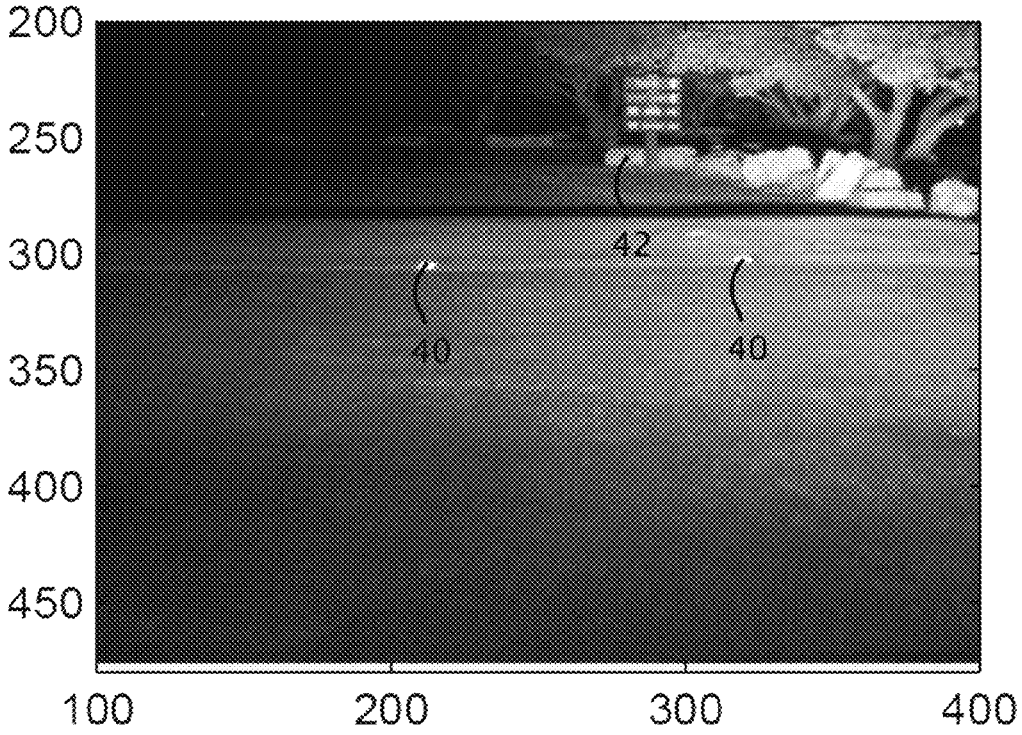

Reference is now made to FIGS. 4a and 4b which show image frames of a speed bump where host vehicle 18 is at a distance away from the speed bump of 40.9 m and 27.0 m respectively, according to a feature of the present invention. FIGS. 4a and 4b show white reflectors 40 and a rock 42. The shadow beyond the speed bump is only slightly wider in FIG. 4b than the shadow in FIG. 4a where host vehicle 18 is farther from the speed bump. Also, the lateral distance difference between reflectors 40 is much more pronounced when compared to the change in shadow width beyond the speed bump for the two image frames. Therefore, the shadow on the far side of the speed bump increases and/or decreases in size much more slowly than the image size of the speed bump itself.

Figure 4C:
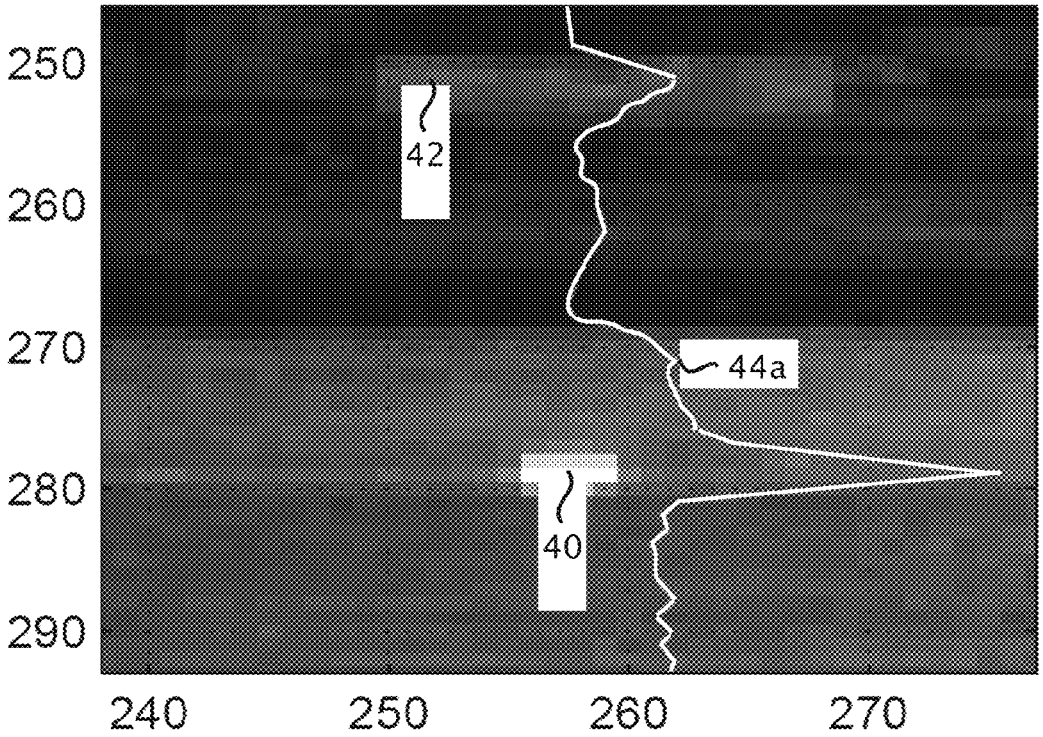
FIGS. 4c and 4d show a portion of image frames as shown respectively in FIGS. 4a and 4b in greater detail to illustrate a feature of the present invention.
Figure 4D:
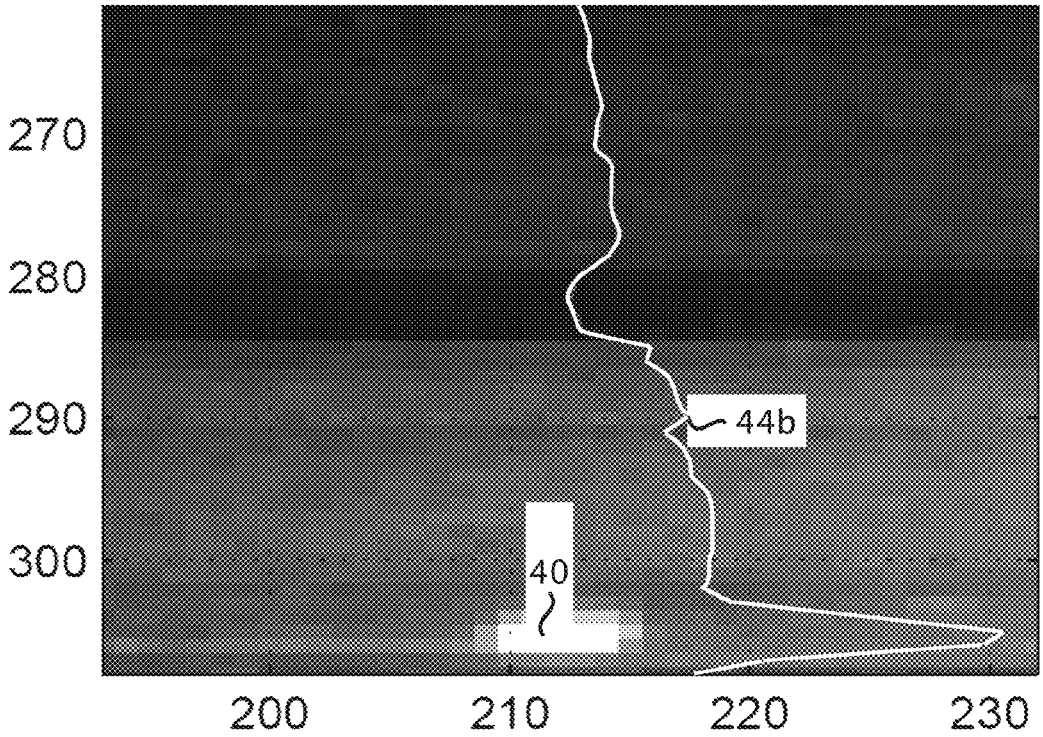

Reference is now made to FIGS. 4c and 4d which show a portion of image frames shown respectively in FIGS. 4a and 4b in greater detail, according to a feature of the present invention. Plotted on each of FIGS. 4a and 4b are respective gray scale value curves 44a and 44b. The further to right curves 44a/44b go laterally, the greater is the gray scale value. Conversely, the further to left curves 44a/44b go laterally, the lesser is the gray scale value. In FIG. 4c where host vehicle 18 is farther from the speed bump, peaks in gray scale value occur by virtue of the contributions from reflection of rock 42 and the illuminated side of the speed bump along with reflection from reflectors 40. Furthermore, it can be observed that the shadow cast by the speed bump is only slightly narrower when the host vehicle 18 is farther from the speed bump.

Changes in road 36 surface material, ice patches, oil marks and tar seams can also produce dark patches on the image of the road 36 surface. However, the size of such a patch in the image 15, as the host vehicle 18 approaches, behaves very differently.

Figure 5A:
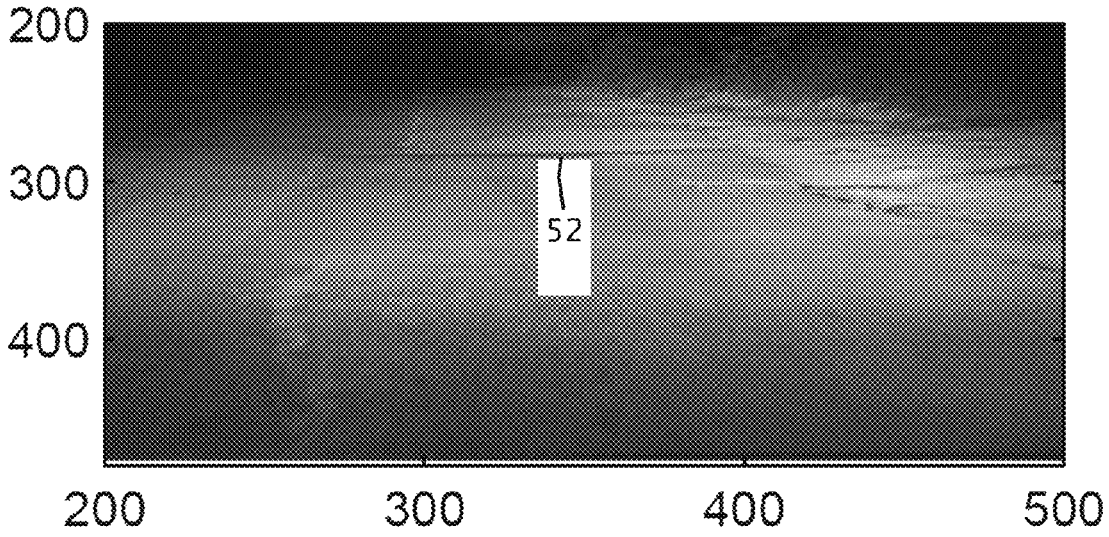
FIG. 5a shows an example of a shadow produced, according to a feature of the present invention.
Figure 5B:
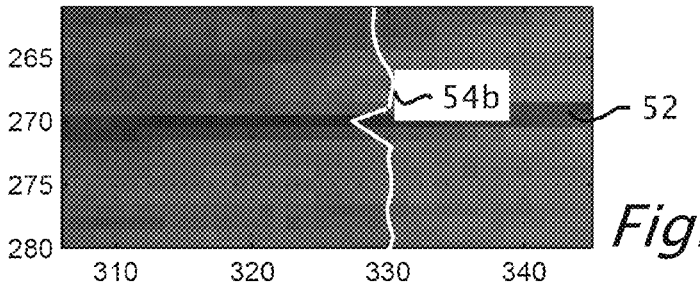
FIGS. 5b, 5c and 5d show further details of the drop in road surface as shown in FIG. 5a, at different distances to the drop.
Figure 5C:
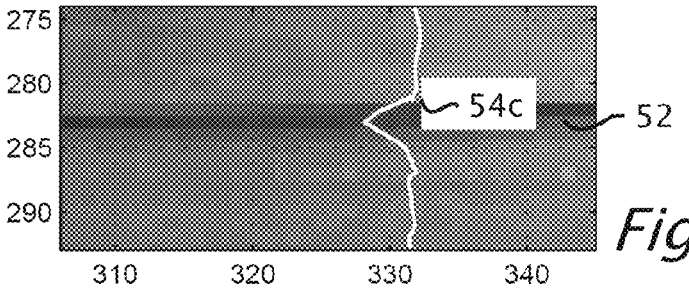
Figure 5D:
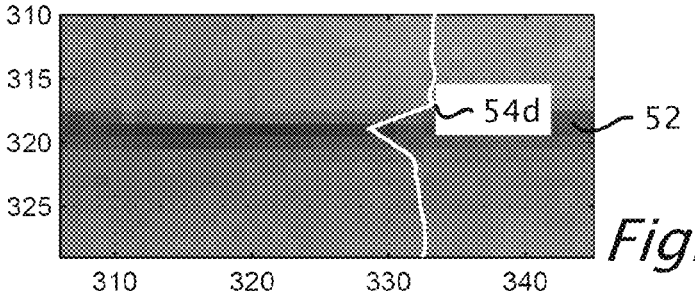

Reference is now made to FIG. 5a shows an example of a shadow produced when there is a drop 52 in the road surface where there is a junction between older and newer asphalt paving. Reference is also made to FIGS. 5b, 5c and 5d shows further details of drop 52, when the distance to drop 52 is at 22 meters (m), 17.7 m and 11.5 m respectively. In FIGS. 5b-5d it can be seen that the size of the shadow of drop 52, where newer paving makes way to old paving and when the road is illuminated by the headlights of host vehicle 18. The shadow of drop 52 hardly changes as host vehicle 18 distance (Z) to drop 52 changes from 22 m to 11.5 m. FIGS. 5b, 5c and 5d have respective gray scale value curves 54b, 54c and 54d for a central column of pixels. The lowest gray scale value is shown by the left lateral peak in respective curves 54b, 54c and 54d in the center of the shadow of drop 52.

Figure 6A:
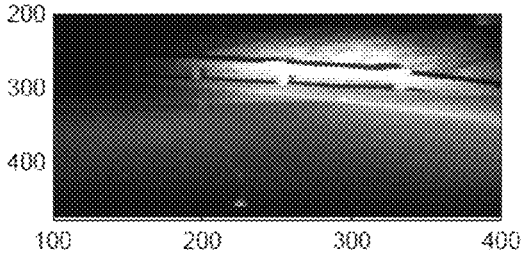
FIG. 6a shows a change in asphalt color with no drop, according to a feature of the present invention.
Figure 6B:
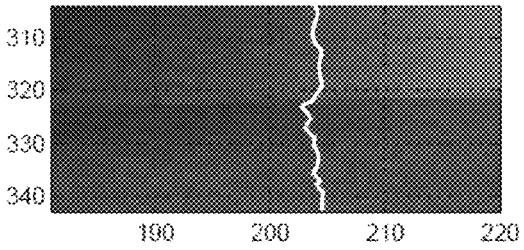

Reference is now made to FIG. 6a which shows a change in asphalt color with no drop, according to a feature of the present invention. The corresponding gray-scale profile for FIG. 6a is shown in FIG. 6b, which shows a simple step in brightness with no dark shadow patch.

Figure 6C:
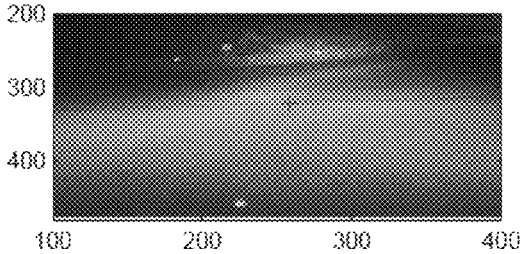
FIGS. 6c and 6e show a dark stripe from a change in asphalt paving of the road shown in successive image frames, according to an aspect of the present invention.
Figure 6D:
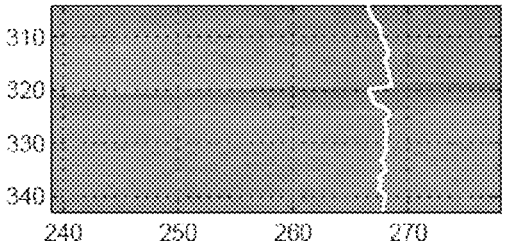
FIGS. 6d and 6f show a simple step edge of brightness in greater detail of respective FIGS. 6c and 6e, according to an aspect of the present invention.
Figure 6E:
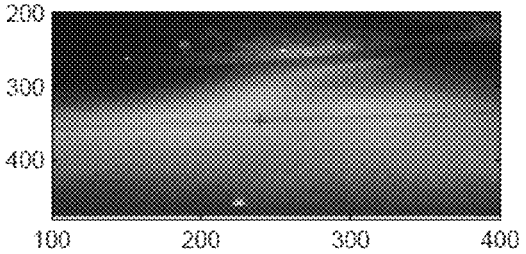
Figure 6F:
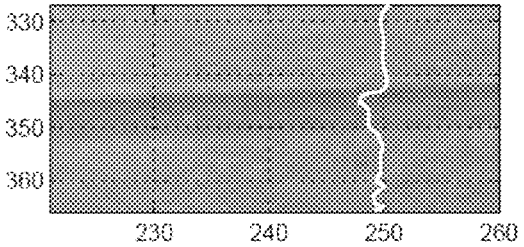

Reference is now made to FIGS. 6c and 6e which show a dark stripe 62 which is a change in asphalt paving of the road shown in successive image frames 15, according to an aspect so of the present invention. The change in asphalt paving of the road is due to a double change in asphalt by virtue of a ditch which was filled in with new asphalt. In each image frame 15 their is no drop in height of the road surface and no shadow is produced. The gray-scale profiles shown in FIGS. 6d and 6f show a simple step edge of brightness in greater detail of respective FIGS. 6c and 6e, according to an aspect of the present invention. FIGS. 6c and 6e show a dark stripe 62 on the road at 14.3 m and 11.2 m. The width of dark stripe 62 as shown in FIGS. 6c and 6e increase in size as a function of the inverse of distance squared ($Z^{-2}$) indicating that dark stripe 62 is a mark on the road and not a shadow from a negative obstacle (obstacle 34 for example).

The techniques described below, use the change in the actual shadow 32 itself due to the host vehicle 18 motion (and thus the motion of the light sources). The actual shadow is then analyzed by the camera 12 that is fixed relative to the light source and moves with it.

The Mathematical Model

Referring back to FIG. 3a, reference point (0,0) is the point on the road 32 directly below camera 12. $H_C$ is the height of the camera, $H_L$ the height of the headlight and $H_T$ the height of obstacle 34. The headlights are $Z_L$ in front of the camera. $Z_T$ is the distance from camera 12 to the edge of obstacle 34 (dotted line 35) and $Z_{S1}$ and $Z_{S2}$ are the close and far points of shadow 32 visible to camera 12.

By similarity of triangles we get:

$$Z_{S1} = \frac{Z_T H_C}{H_C - H_T} \tag{1}$$

$$Z_{S2} = \frac{(Z_T - Z_L)H_L}{H_L - H_T} + Z_L \tag{2}$$

$$= \frac{Z_T H_L = Z_L H_T}{H_L - H_T} \tag{3}$$

Let y1 and y2 be the lower and upper edges of a shadow patch in the image:

$$y_1 = \frac{fH_C}{Z_{S1}} \tag{4}$$

$$y_2 = \frac{fH_C}{Z_{S2}} \tag{5}$$

The height or thickness of the patch in the image is then given by y1−y2:

$$y_1 - y_2 = \frac{fH_C}{Z_{S1}} - \frac{fH_C}{Z_{S2}} \tag{6}$$

$$= \frac{fH_C(H_C - H_T)}{Z_T H_C} - \frac{fH_C(H_L - H_T)}{Z_T H_L - Z_L H_T} \tag{7}$$

For $Z_L << Z_T$ we can approximate $$y_1 - y_2 \approx \frac{f(H_T H_C - H_T H_L)Z_T}{Z_T^2 H_C} \tag{8}$$

-continued $$\approx \frac{fH_T(H_C - H_L)}{Z_T H_C} \tag{9}$$

The image thickness of the shadow patch changes as a function of $Z_T^{-1}$ and given an estimate of $Z_T$ one can also estimate the (negative) height of obstacle 34.

Consider now a marking on road 36 which at time $t_O$ stretches from a distance $Z_{S1}$ ($t_O$) to a distance $Z_{S2}$ ($t_O$). Let:

$$\alpha = Z_{S2}(t_O) - Z_{S1}(t_O) \tag{10}$$

$$Z_{S3} = Z_{S1} + \alpha \tag{11}$$

The height or thickness of the marking in the image is given by:

$$y_3 - y_1 = \frac{fH_C}{Z_{S1} + \alpha} - \frac{fH_C}{Z_{S1}} \tag{12}$$

$$= \frac{fH_C \alpha}{(Z_{S1} + \alpha)Z_{S1}} \tag{13}$$

$$\approx \frac{fH_C \alpha}{Z_{S1}^2} \tag{14}$$

Numerical Example

Figure 7:
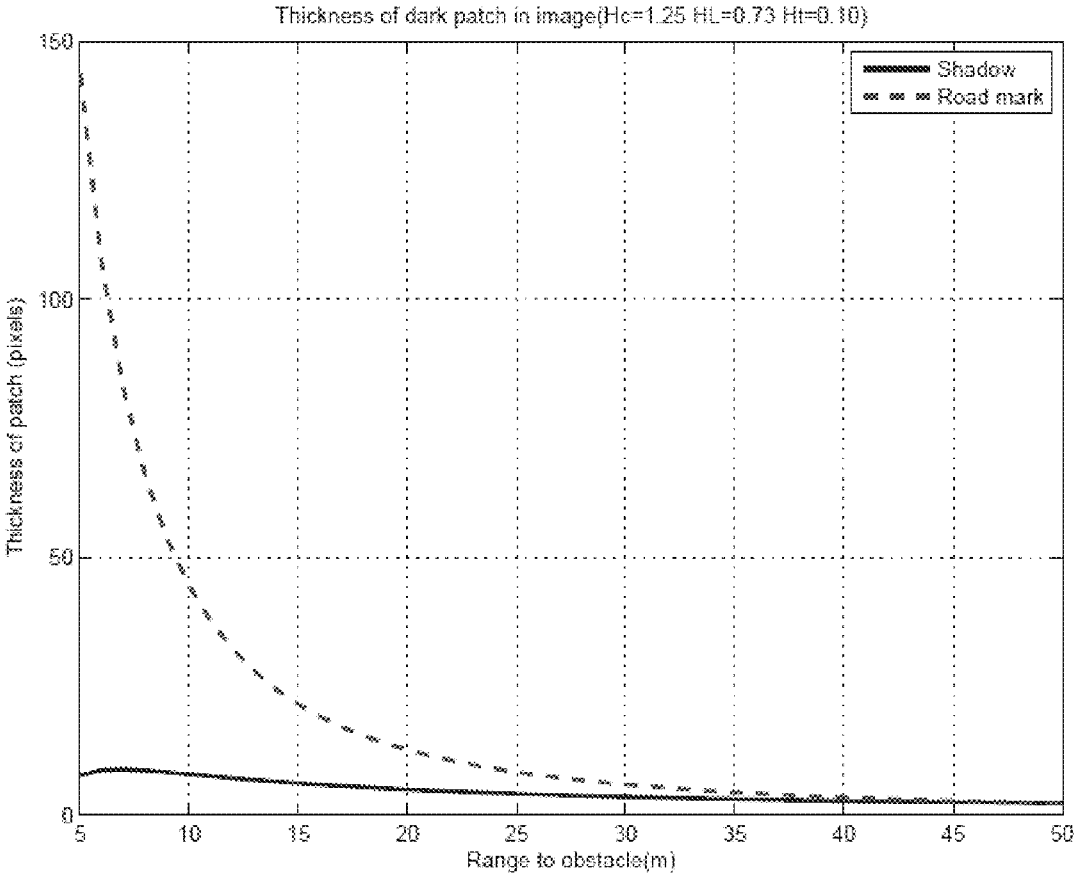
FIG. 7 which shows a graph of simulation results, according to a feature of the present invention.

Reference is now made to FIG. 7 which shows a graph 70 for a simulation, according to a feature of the present invention. Graph 70 plots two curves, one for a patch or road mark (dotted line) and one for a shadow strip (solid line). The thickness of the patch or shadow strip is in pixels versus range to obstacle in meters (m). The simulation has camera 12 mounted in a Renault Megane II where $H_C$=1.25 m, $H_L$=0.73 m and obstacle of height $H_T$=0.1 m. A shadow will appear just over 2 pixels thick at 50 m. At 25 m the shadow will double in size to about 4 pixels. A road mark on road at 25 m will quadruple in size to 8 pixels.

Note that at a certain close distance (≈5 m) the tangent line of the headlight and of the camera 12 coincide. After passing 5 m the size of the shadow patch decreases rapidly.

Referring back to FIGS. 3a and 3b, FIGS. 3a and 3b show a step edge drop. The step edge drop is typical for a pot hole, road edge and steep speed bump. With the step edge drop, the tangent point which causes shadow 32 and the tangent point of the viewing angle from camera 12 can be approximated as the same point and which is fixed in space as host vehicle 18 moves. For extended smooth speed bumps this approximation breaks down, however.

Figure 8A:
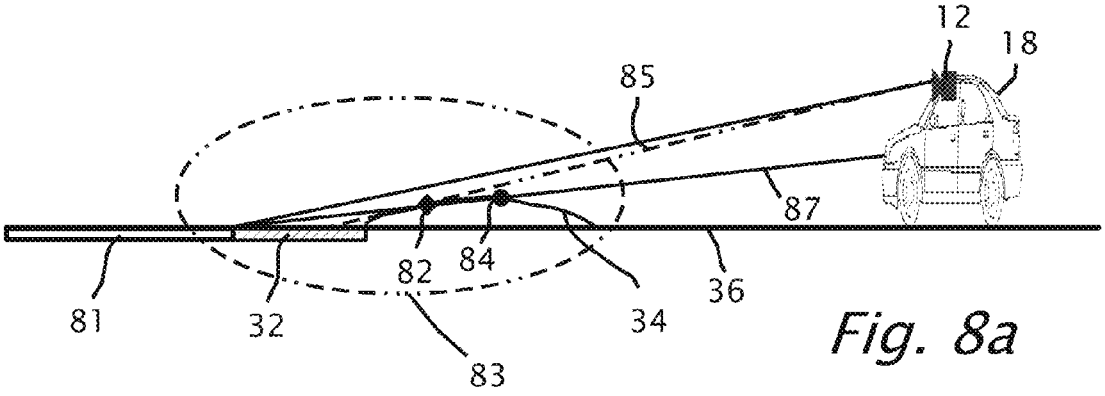
FIGS. 8a and 8b shows a simplified line drawing of a night time driving scenario and an area of greater detail of the night time driving scenario respectively, according to a feature of the present invention.
Figure 8B:
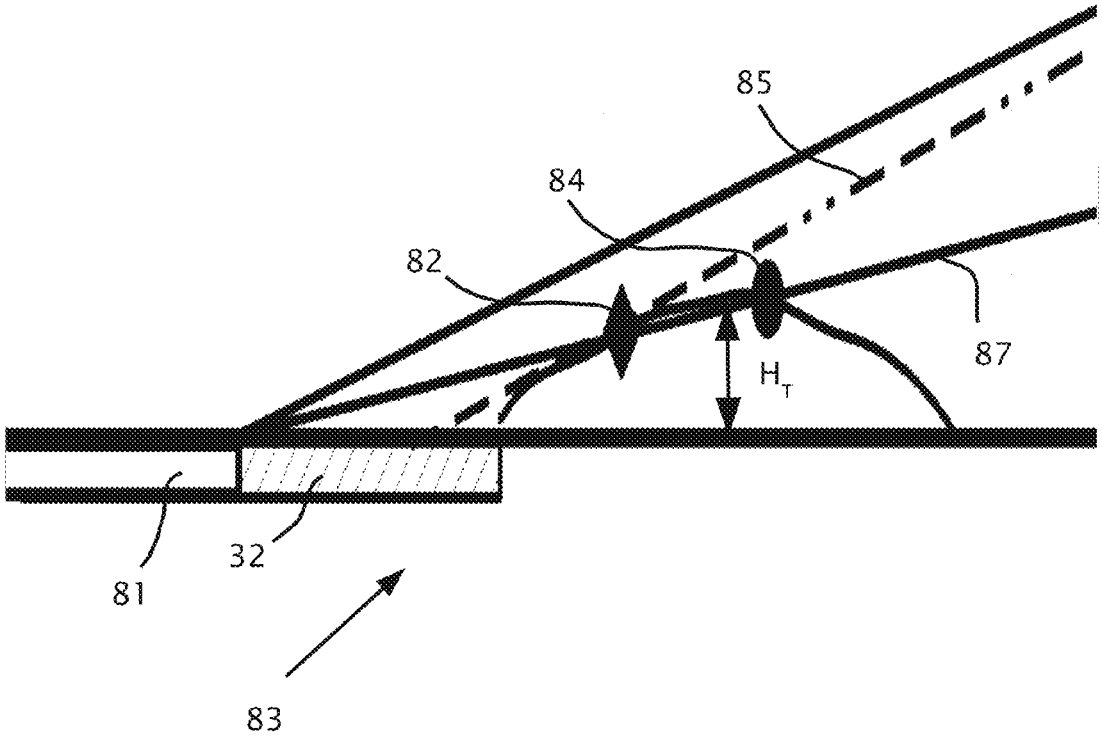

Reference is now made to FIGS. 8a and 8b which shows a simplified line drawing 80 of a night time driving scenario and an area 83 of greater detail of the night time driving scenario respectively, according to a feature of the present invention. In FIGS. 8a and 8b, the tangent viewing ray 85 touches the speed bump 34 further away than the tangent illumination ray 87. As host vehicle 18 moves forward, the tangent point 62 of the viewing ray 65 moves further away along the speed bump or obstacle 34. This means that the near edge of shadow 32, in image space, will move slower than a typical road point. The exact motion depends on the shape of speed bump 34 and can be used to measure the curvature of obstacle 34.

It can also be seen that as host vehicle 18 moves forward, tangent point 84 of illumination ray 87 moves further away along obstacle 34 and the height $H_T$ decreases. The result is that the far edge of shadow 32 on road 36 will move towards the host vehicle 18 even faster than predicted by a sharp edge. Shadow 32 on road 36 moving towards the host vehicle 18 even faster than predicted by the sharp edge effect will accelerate when host vehicle 18 gets close to the speed bump or obstacle 34 and at some distance shadow 32 will disappear completely.

From experimental results shown later, at far distances (above 30 m), shadow 32 behaves more like a step edge and disappears at about 7.0 m from camera 12.

The analysis of rounded edges is complex. The tangent point 84 for the headlights does not correspond exactly to the tangent point 82 of camera 12 line of sight. Furthermore, as the host vehicle 18 moves closer to obstacle 34, tangent point[s 82 and 84?] will move further away and closer to road 36. In order to analyze a rounded edge obstacle 34 (e.g. speed bump), the edge was approximated as a piecewise linear curve of 10 segments dropping from $H_T$=0.1 m down to zero over a given length:

$$Z_T(i)=Z_T(0)+i*\delta Z \tag{15}$$

$$H_T(i)=H_T*(1-0.1*i) \tag{16}$$

where i=1 . . . 10.

Figure 9:
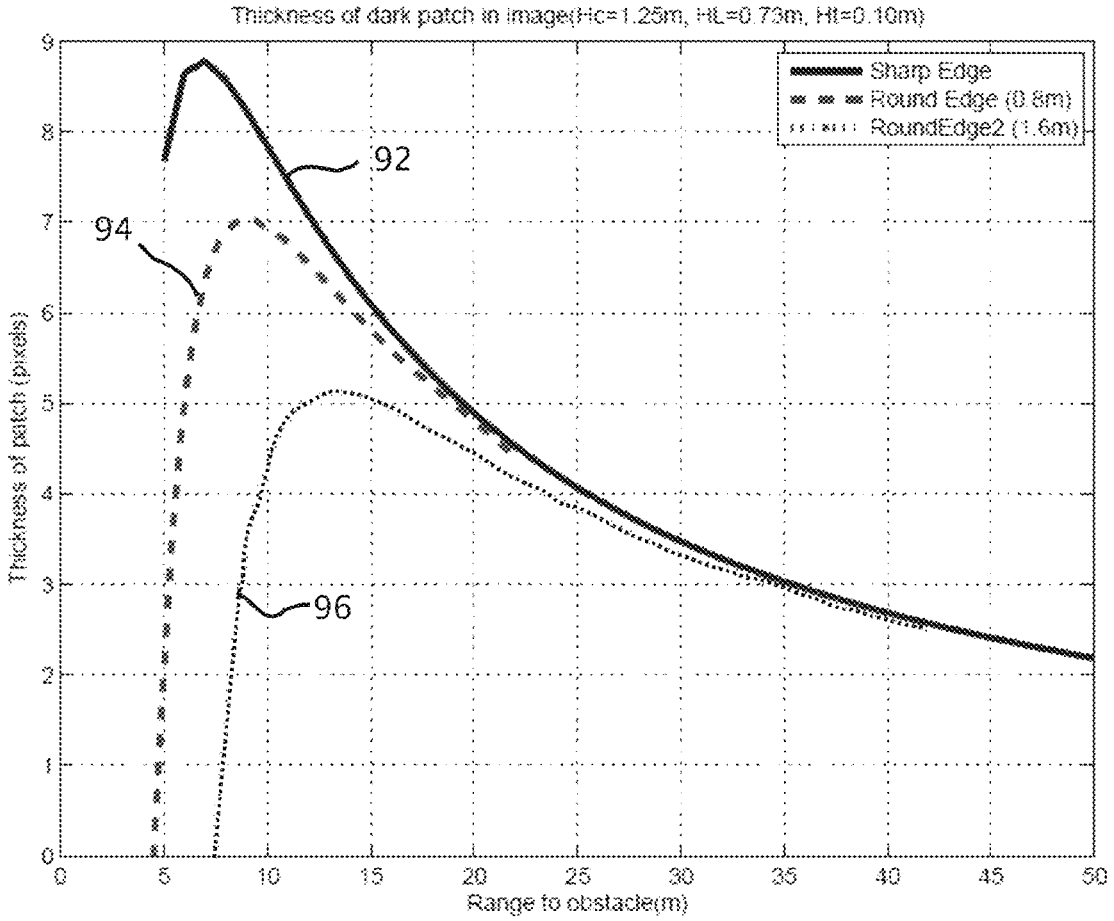
FIG. 9 shows a graph of a simulation for a drop in road surface of 0.1 m over a length of 0.8 m and 1.6 m, according to a feature of the present invention.
Figure 10A:
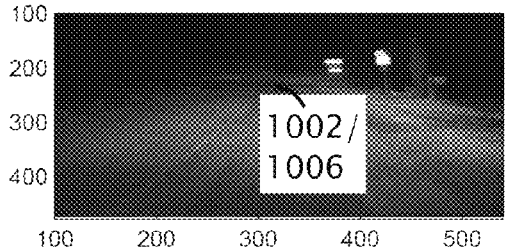
FIGS. 10a-10e show a sequence of five images where a host vehicle approaches a speed bump and a shadow, according to a feature of the present invention.
Figure 10B:
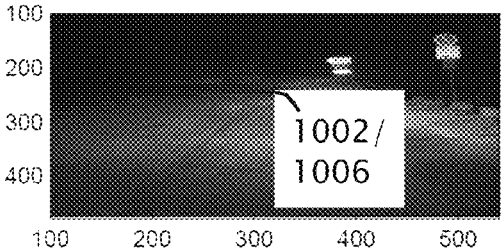
Figure 10C:
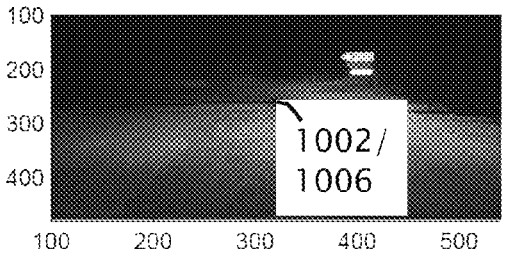
Figure 10D:
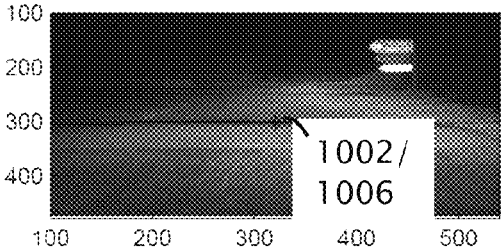
Figure 10E:
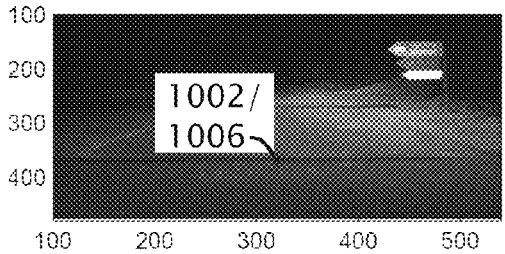
Figure 10F:
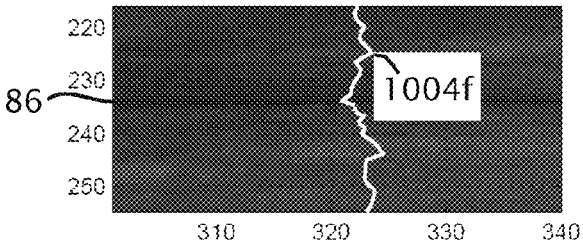
FIGS. 10f-10j show greater detail of the speed bump and the shadow for respective FIGS. 10a-10e.
Figure 10G:
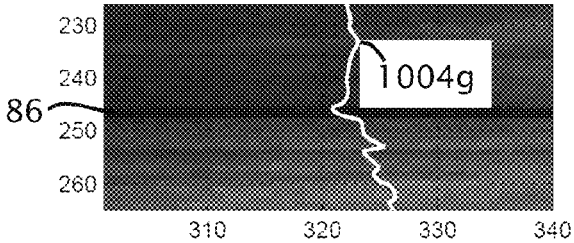
Figure 10H:
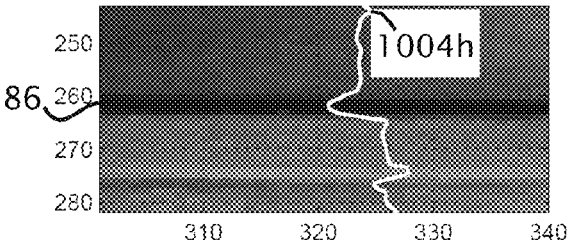
Figure 10I:
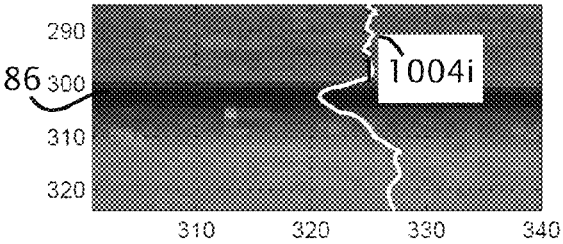
Figure 10J:
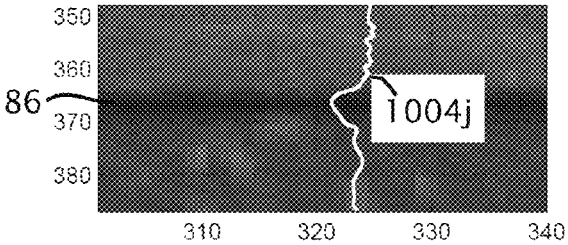

Reference is now made to FIG. 9 which shows a graph 90 for a simulation for a drop of 0.1 meter in road surface over a length of 0.8 meter and 1.6 meter, according to a feature of the present invention. Three curves are shown for thickness (pixels) of shadow versus range to speed bump or obstacle 34 in meters (m). Solid line 92 is for a sharp edge, dotted line 94 is for a round edge for the drop of 0.1 m over the length of 0.8 m and dotted line 96 is for another round edge for the drop of 0.1 m over the length of 1.6 m.

Host vehicle 18 in the simulation, approaches the speed bump or obstacle 34 from 50 meter down to 5 meter in steps of 1 meter. At each distance it was determined (for each of the two cases: 0.8 m and 1.6 m) which point along the piecewise linear curve was the occluding point for the headlight and produced the far edge and which was the occluding point for camera 12 and produced the near edge. As can be expected, to the shorter the drop, the more it behaves like a step edge.

Experiments and Results

FIGS. 10a-10e show a sequence of five image frames 15 where host vehicle 18 approaches speed bump 1002 and shadow 1006, according to a feature of the present invention. FIGS. 10f-10j show greater detail of speed bump 1002 and shadow 1006 for respective FIGS. 10a-10e. In FIGS. 10a-10e the distance (Z) to speed bump 1002 and shadow 1006 are 66 m, 42.4 m, 26.4 m, 13.6 m and 7.9 m respectively. Shadow 1006 at the far side of speed bump 1002 was first detected at over 40 m and then tracked as it grew closer to host vehicle 18. FIGS. 10f-10j have respective gray scale value curves 1004f-1004j for a central column of pixels. The lowest gray scale value for the central column is shown by the lateral left peak in respective curves 1004f-1004j in the center of shadow 1006.

Figure 11:
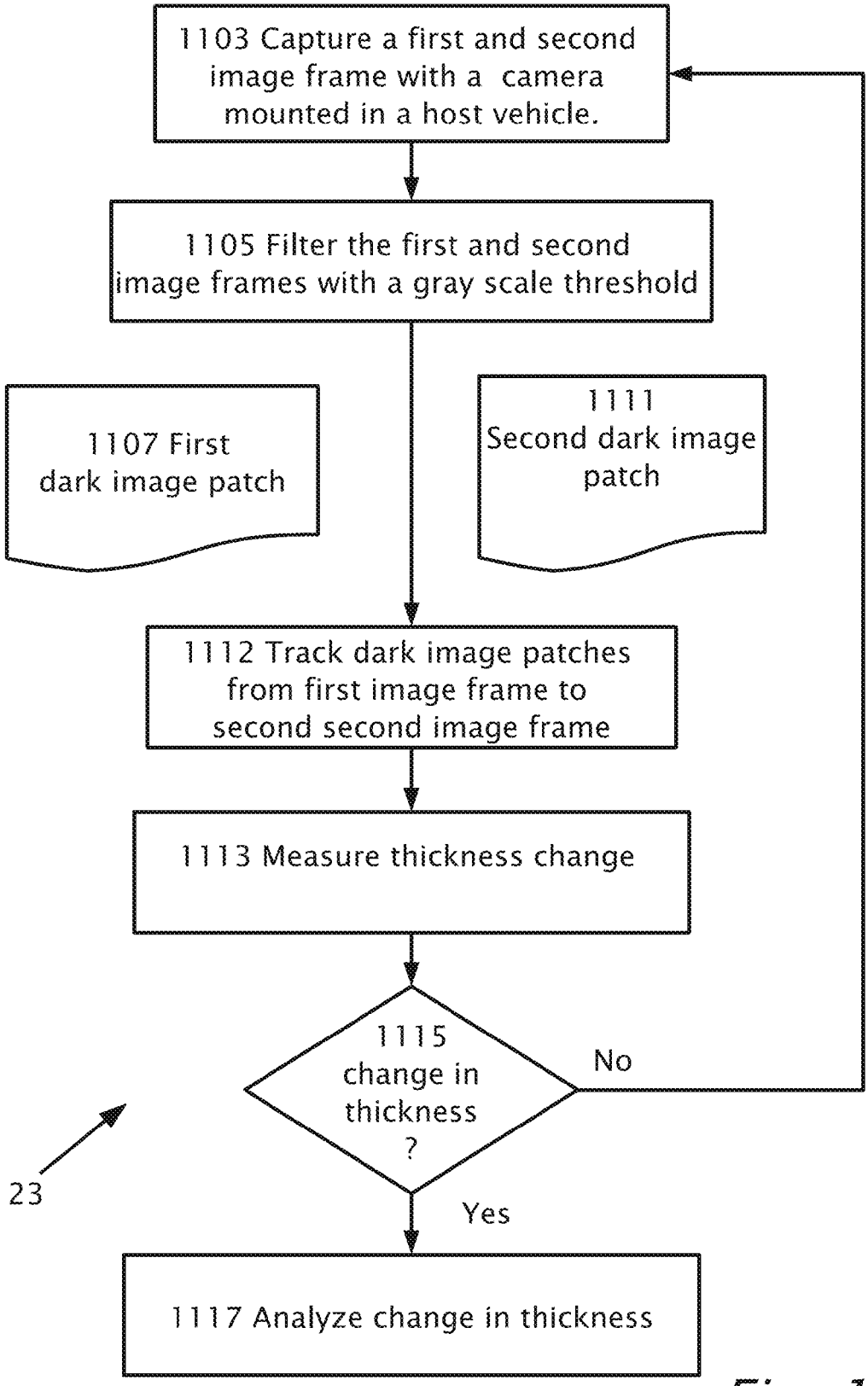
FIG. 11 shows a flow chart of a method, according to a feature of the present invention.

Reference is now made to FIG. 11 which shows a flow chart of a method 23, according to a feature of the present invention.

In step 1103, a first image frame 15 is captured, followed by the capture of a second image frame 15 from camera 12 processor 30 of system 16.

Optionally, image frames 15 may be warped to compensate for a change in vehicle orientation, i.e. roll, pitch and yaw, which may be determined from image frames 15 or from external sensor(s) connected to driver assistance system 16.

The first and the second image frames 15 are then filtered (step 1105) according to a threshold, e.g. a previously determined threshold, to produce a first dark image patch 1107 of first image frame 15 and a second dark image patch 1111 of the second image frame 15 respectively. First image patch 1107 and optionally second image patch 1111 are analyzed for connectivity of picture elements.

One or more connected components of first image patch 1107 is tracked (step 1112) from the first image frame 15 to second dark image patch 1111 of second image frame 15.

Tracking step 1113 may be performed by using the expected image motion for road points given host vehicle 18 speed and nearest neighbor.

The thicknesses of first image patch 1107 and second dark image patch 1111 are measured (step 1113) in both the first image frame 15 and the second image frame 15. By way of example, an image strip of twenty pixel columns wide, from the bottom of an image frame 15 and up to the image row corresponding to 80 meters may be analyzed for connected components. The patch or shadow thickness may be computed (step 1113) by counting the number of pixels in the connected component divided by the strip width in columns (i.e. 20 pixels).

In decision block 1115, the thicknesses of candidate shadows 1109 tracked across successive image frames may be accumulated. From the change of thicknesses tracked across successive image frames for first dark image patch 1107 and second dark image patch 1111 it is possible to analyze (step 1117) if the change of thicknesses is consistent with a shadow cast by an obstacle from illumination from the headlights in order to for instance audibly warn a driver of host vehicle 18 of an obstacle 34 in road 36, or to apply brakes without driver intervention. First image patch 1107 and second dark image patch 1111 may be shadows of an obstacle from the headlights of vehicle 18 or alternatively a darker road texture unrelated to an obstacle in the road.

Figure 12:
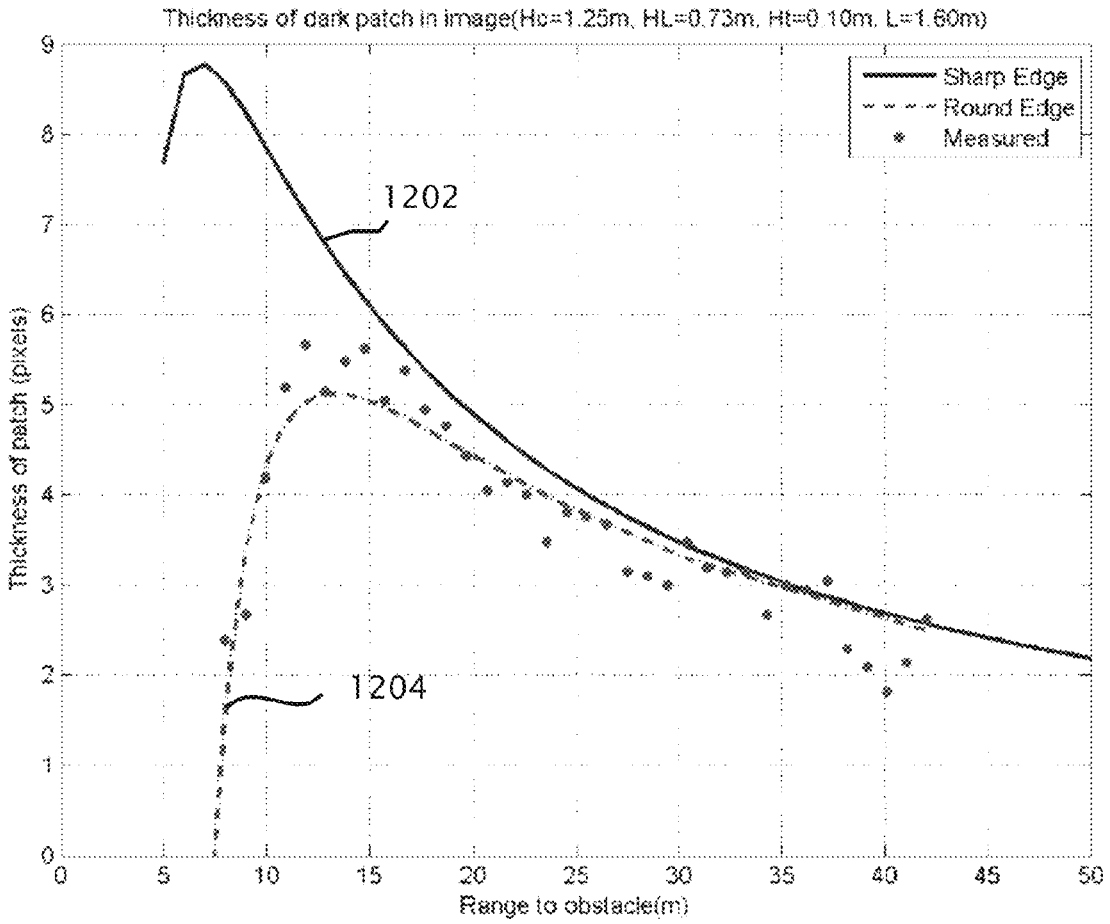
FIG. 12 shows a graph of the thickness of shadow at the far side of a speed bump as a function of distance to the speed bump, according to feature of the present invention.

Reference is now made to FIG. 12 which shows a graph 1200 of the thickness of shadow 1006 at the far side of speed bump 1002 as a function of distance to speed bump 1002, according to feature of the present invention. Dots show the results measured in the sequence of frames captured. The curves 1202 (sharp edge) and 1204 (round edge) shown the simulation of a bump 0.1 m high for a sharp drop and a smooth drop respectively. The results show that in practice the shadows behave according to the model. Shadow 1006 behaves approximately like $Z^{-1}$ and not $Z^{-2}$. Shadow 1006 appears to behave like a rounded drop however, further experiments may be required using ground truth from accurately measured road structures.

Figure 13A:
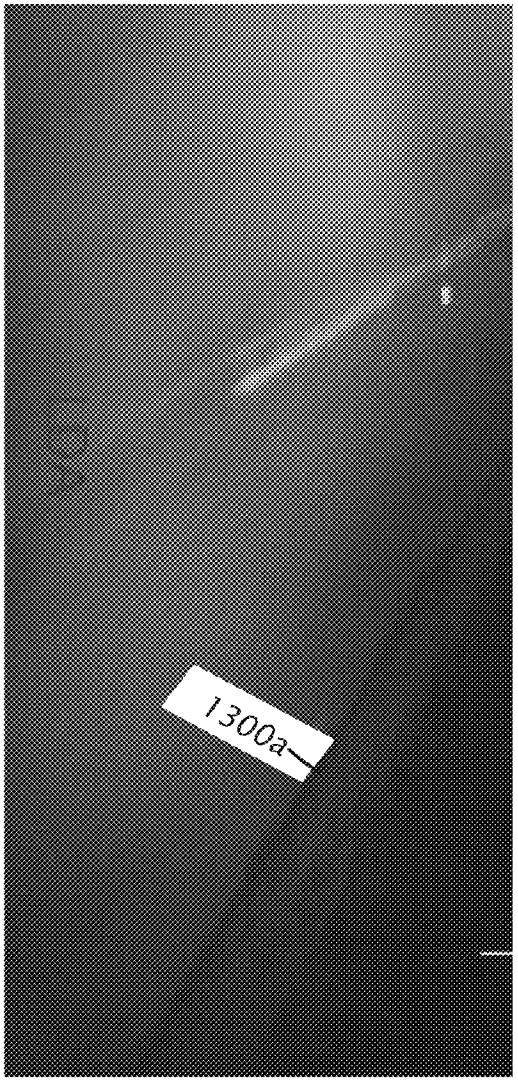
FIGS. 13a and 13b show two examples of soft shoulders at the road edge, according to feature of the present invention.
Figure 13B:
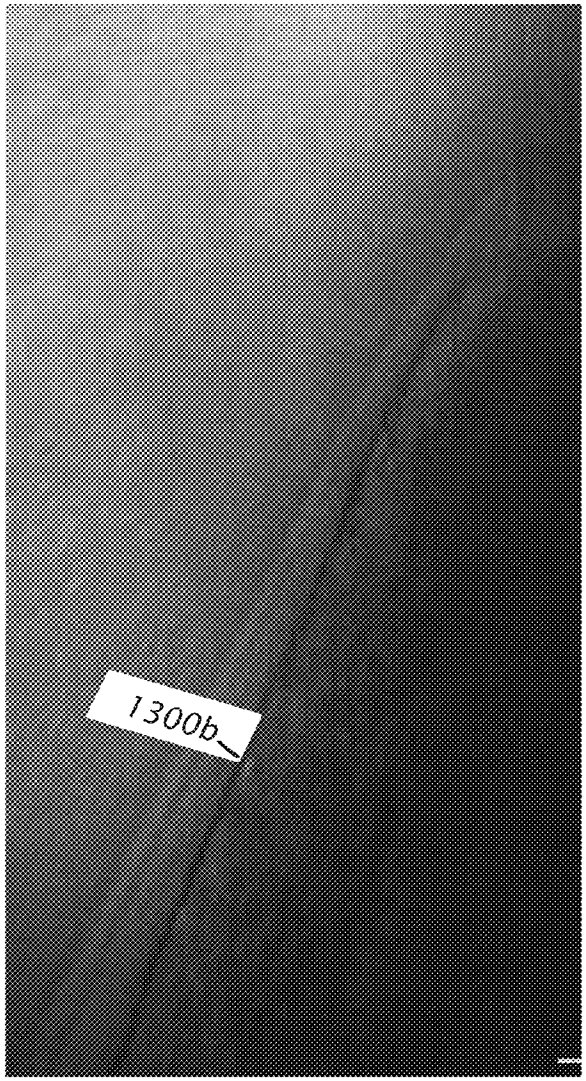

Reference is now made to FIGS. 13a and 13b which show two examples of soft shoulders at the road edge, according to feature of the present invention. The drop between the asphalt and the gravel shoulder, results in a narrow shadow line 1300a and 1300b respectively that are darker than both the asphalt or the gravel. Often in country roads the asphalt paved on top of gravel and there is a step transition (drop) from the asphalt to the gravel. The step transition is called a soft shoulder which is a negative obstacle and will also generate a shadow like shadow lines 1300a and 1300b. Soft shoulders can thus be detected by looking for a dark strip a few pixels wide at the edge between the dark asphalt and the lighter gravel. The shadow strip will be even darker than the asphalt. The width of shadow lines 1300a and 1300b indicate the shoulder drop.

These dark shadow lines 1300a and 1300b have a unique feature; unlike road markings such as lane marks that get narrower in the image as they approach the horizon, the shadows like 1300a and 1300b on road edges stay the same width. On a straight road, the inner edge of the shadow would be a line passing through the vanishing point of the road while the outer edge is a line that passes a few pixels to the side of this vanishing point.

The term "obstacle" as used herein in reference to a road refers to a "positive obstacle" and a "negative obstacle". The term "positive obstacle" as used herein is an obstacle extends vertically upward in real space above the road surface such as a speed bump or a vertical bump caused by new asphalt paving in the direction of motion of the vehicle. The term "negative obstacle" as used herein extends vertically downward in real space below the road surface such as a hole or a drop in asphalt paving in the direction of motion of the vehicle.

The term "shape" of an obstacle, as used herein refers to the vertical contour in real space along the direction of motion of the vehicle The indefinite articles "a", "an" is used herein, such as "a shadow", an "obstacle" has the meaning of "one or more" that is "one or more shadows" or "one or more obstacles".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. A computerized method performable at night by a driver assistance system mountable in a host vehicle while the host vehicle is moving forward with headlights on, wherein the driver assistance system includes a camera operatively connectible to a processor, the method comprising:

capturing a first image frame and a second image frame of a road in the field of view of the camera;

processing said first image frame and said second image frame to locate a first dark image patch of said first image frame and a second dark image patch of said second image frame; tracking said first and said second dark image patches from said first image frame to said second image frame as corresponding images of the same portion of the road;

measuring respective thicknesses in vertical image coordinates of said first and second dark image patches responsive to said tracking from said first image frame to said second image frame; and determining that a change of said thicknesses between said first and second dark image patches is consistent with a shadow cast by an obstacle in the road illuminated by the headlights.

2. The method of claim 1, wherein said processing is performed by filtering said first image frame and said second image frame with a threshold value of gray scale to produce said first dark image patch of said first image frame and said second dark image patch of said second image frame, wherein said first dark image patch and said second dark image patch include intensity values less than said threshold value.

3. The method of claim 1, further comprising:

prior to said tracking, verifying connectivity of picture elements within said first dark image patch.

4. The method of claim 1, further comprising:

determining respective distances Z from the camera to the obstacle during the capturing of the first and the second image frames, wherein the thicknesses change proportionally to inverse distance $Z^{-1}$ or the thicknesses change less than proportionally to inverse distance $Z^{-1}$ thereby detecting that the first and second dark image patches are the shadow cast by the obstacle in the road illuminated by the headlights.

5. The method of claim 4, further comprising:

audibly warning a driver of the host vehicle responsive to said detecting said obstacle.

6. The method of claim 4, further comprising:

analyzing change in said thicknesses between said first and second image frames, thereby distinguishing between the detected obstacle being a positive or a negative obstacle.

7. The method of claim 4, further comprising:

analyzing change in said thicknesses between said first and second image frames, thereby computing a shape of the detected obstacle.

8. The method of claim 1, further comprising:

determining that a change of said thicknesses between said first and second image frames is not consistent with a shadow cast by an obstacle illuminated by the headlights.

9. The method of claim 1, wherein said thicknesses are measured in picture elements according to a total number of picture elements with intensity values less than said threshold divided by a width in picture element columns of said first and second dark image patches.

10. A driver assistance system including a camera and a processor configured to[perform the computerized method, according to claim 1]:

*capture a first image frame and a second image frame of a road in the field of view of the camera;*

*process said first image frame and said second image frame to locate a first dark image patch of said first image frame and a second dark image patch of said second image frame; tracking said first and said second dark image patches from said first image frame to said second image frame as corresponding images of the same portion of the road;*

*measure respective thicknesses in vertical image coordinates of said first and second dark image patches responsive to said tracking from said first image frame to said second image frame; and*

*determine that a change of said thicknesses between said first and second dark image patches is consistent with a shadow cast by an obstacle in the road illuminated by the headlights.*

11. A driver assistance system mountable in a host vehicle, the driver assistance system comprising:

a processor;

a camera operatively connectible to the processor, while the host vehicle is moving with headlights on, the processor is configured to capture from the camera a first image frame and a second image frame of a road in the field of view of the camera;

wherein the processor is configured to process said first image frame and said second image frame to locate a first dark image patch of said first image frame and a second dark image patch of said second image frame;

wherein the processor is configured to track said first and second dark image patches from said first image frame to said second image portion of said second image frame as corresponding images of the same portion of the road;

wherein the processor is configured to measure respective thicknesses in vertical image coordinates of said first and second dark image patches responsive to said tracking from said first image frame to said second image frame; and wherein the processor is configured to determine that a change of said thicknesses between said first and second dark image patches is consistent with a shadow cast by an obstacle in the road illuminated by the headlights to detect the obstacle in the road.

12. The driver assistance system of claim 11, wherein respective distances Z from the camera to the obstacle are determinable during the capture of the first and the second image frames, wherein the thicknesses change proportionally to inverse distance $Z^{-1}$ or the thicknesses change less than proportionally to inverse distance $Z^{-1}$ to detect that the first and second dark image patches are the shadow cast by the obstacle in the road illuminated by the headlights.

13. The driver assistance system of claim 12, wherein the processor is configured to analyze change in said thicknesses between said first and second image frames to distinguish between the detected obstacle being a positive or a negative obstacle.

14. The driver assistance system of claim 12, wherein the processor is configured to analyze change in said thicknesses between said first and second image frames to compute a shape of the detected obstacle.

15. The driver assistance system of claim 11, wherein the processor is configured to determine that a change of said thicknesses between said first and second image frames is not consistent with a shadow cast by an obstacle illuminated by the headlights.

16. The method of claim 8, further comprising determining that a change of said thicknesses between said first and second dark image patches is consistent with a marking in the road by determining respective distances from the camera to the marking in the road during the capturing of the first and the second image frames, wherein the thicknesses change proportionally to inverse square distance to the marking and detecting thereby that the first and second dark image patches are images of the marking in the road.

17. The driver assistance system of claim 15, wherein respective distances from the camera to a marking in the road are determinable during the capture of the first and the second image frames, wherein the thicknesses change proportionally to inverse square distance to the marking to detect that the first and second dark image patches are images of the marking in the road.

*18. A computerized method performable at night by a driver assistance system mountable in a host vehicle while the host vehicle is moving forward with headlights on, wherein the driver assistance system includes a camera operatively connectible to a processor, the method comprising:*

*capturing a first image frame and a second image frame of a road in a field of view of the camera;*

*processing the first image frame and the second image frame to locate a first dark image patch of the first image frame and a second dark image patch of the second image frame;*

*measuring respective sizes of image coordinates of the first and second dark image patches in the first image frame and the second image frame; and*

*determining that a change of the respective sizes between the first and second dark image patches is consistent with a shadow cast by an obstacle in the road illuminated by the headlights.*

*19. The method of claim 18, wherein the measured respective sizes of the image coordinates of the first and second dark image patches are vertical thicknesses.*

*20. The method of claim 18, wherein the measured respective sizes of the image coordinates of the first and second dark image patches are horizontal widths.*

*21. The method of claim 18, wherein the obstacle includes an object, a speed bump, a raised manhole cover, a pothole, or a road edge.*

*22. A driver assistance system mountable in a host vehicle, the driver assistance system comprising:*

*a processor;*

*a camera operatively connectible to the processor, wherein while the host vehicle is moving with headlights on, the processor is configured to:*

*capture from the camera a first image frame and a second image frame of a road in a field of view of the camera;*

*process the first image frame and the second image frame to locate a first dark image patch of the first image frame and a second dark image patch of the second image frame;*

*measure respective sizes of image coordinates of the first and second dark image patches in the first image frame and the second image frame; and*

*determine that a change of the respective sizes between the first and second dark image patches is consistent with a shadow cast by an obstacle in the road illuminated by the headlights to detect the obstacle in the road.*

*23. The driver assistance system of claim 22, wherein the measured respective sizes of the image coordinates of the first and second dark image patches are vertical thicknesses.*

*24. The driver assistance system of claim 22, wherein the measured respective sizes of the image coordinates of the first and second dark image patches are horizontal widths.*

*25. The driver assistance system of claim 22, wherein the obstacle includes an object, a speed bump, a raised manhole cover, a pothole, or a road edge.*

* * * * *